Dec. 12, 1967     D. J. HUHN     3,357,140
KNIFE SHARPENER FOR FORAGE HARVESTERS AND THE LIKE
Filed Sept. 10, 1965
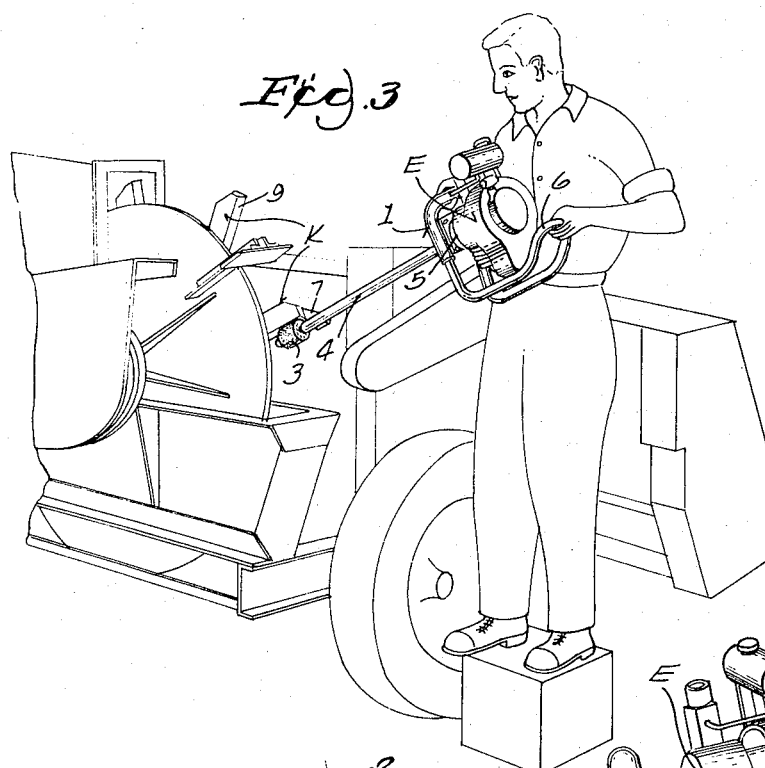
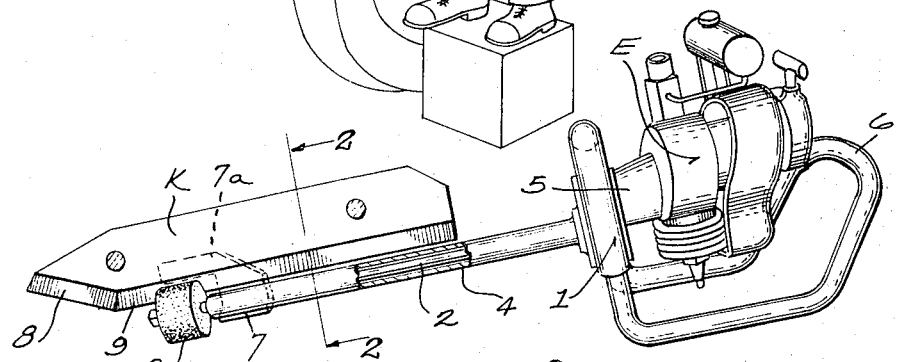
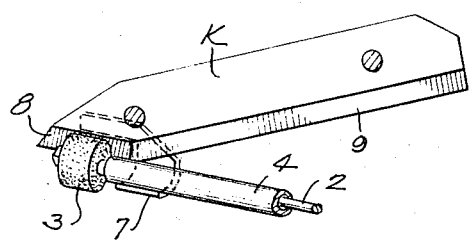
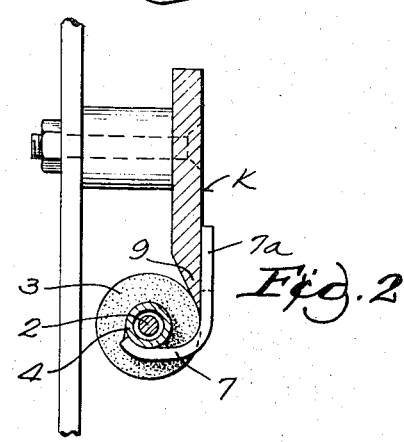
INVENTOR:
DONALD J. HUHN
BY: James E. Nilles
ATTORNEY

United States Patent Office 3,357,140
Patented Dec. 12, 1967

3,357,140
KNIFE SHARPENER FOR FORAGE
HARVESTERS AND THE LIKE
Donald J. Huhn, West Bend, Wis., assignor to Gehl Bros. Manufacturing Company, West Bend, Wis., a corporation of Wisconsin
Filed Sept. 10, 1965, Ser. No. 486,329
4 Claims. (Cl. 51—173)

This invention relates to a knife sharpener and finds particular utility for sharpening the blades of a forage harvester when the blades are installed in their operating position.

An object of the invention is to provide a portable and easily handled knife grinder which can be inserted into restricted areas and which can be accurately guided relative to the knife so as to sharpen the same at the proper, uniform angle. More specifically, the invention contemplates a grinder of the above type which has a long drive shaft surrounded by a tubular member, the tubular member in turn having a guide which holds the sharpening stone at the proper angle and disposition relative to the knife being sharpened.

Generally, the invention provides a knife sharpener by means of which the knives on a forage harvester can be sharpened without removing them from the machine, and which operation takes relatively little time and can be accomplished by inexperienced operators.

These and other objects of the invention will become more apparent as the disclosure progresses, reference being had to the accompanying drawings in which:

FIGURE 1 is a perspective view of the knife sharpener as used when sharpening a knife FIGURE 2 is a cross sectional view taken along line 2—2 in FIGURE 1 but on an enlarged scale;

FIGURE 3 is a perspective view of a portion of a forage harvester and showing the present invention as being used thereon; and FIGURE 4 is a perspective view showing the knife sharpener as when sharpening the inner heel of the knife.

Referring in greater detail to the drawings, a source of power is provided in the form of an internal combustion engine E which is completely portable for use anywhere such as out in the field. Other portable power units could be employed, for example, a cordless electric motor.

The engine has a support frame 1 which in turn has a long drive shaft 2 extending therefrom and to the end of which a cylindrical sharpening or grinding wheel 3 is fixed for being rotated with the drive shaft. A tubular member 4 surrounds the drive shaft and is fixed to the frame portion 5 of the engine. An operator's handle 6 is also attached to the frame of the engine at the approximate point of juncture between the member 4 and the frame 5. It should also be noted that due to the shape and location of the handle 6, the unit is easy to operate and nicely balanced in operation, and that the entire unit is highly portable and light in weight.

The speed of the engine is in the neighborhood of 3,000 r.p.m., with a geared step up transmission to operate the stone at 5,000 to 6,000 feet per minute surface speed, which speed has been found to be very effective in performing the functions for which the unit is designed.

It will be noted that the sharpening wheel or stone 3 is of rather small diameter, on the order of 2 inches, which is important in reaching the knife located in restricted areas, and still be of a large enough size to reach and accommodate the heel 8 of the knife K.

It should also be noted that the drive shaft and surrounding tube are of considerable length, a length of about two feet having been found to be particularly desirable for sharpening knives of forage harvesters.

In order to maintain the grinding wheel 3 at the proper angle relative to the knife edge 9, namely that position shown in FIGURE 2, a curved bracket 7 is welded to the tube 4, adjacent the outer end of the latter, and the bracket has a straight portion 7a which is adapted to lay flat and firmly along the backside of the knife. The operator can more or less feel that the bracket and stone are properly embracing the edge of the knife to be sharpened (as shown in FIGURE 2), and it is only necessary for the operator to maintain the tube in a position parallel to the knife (as shown in FIGURE 1) to thereby insure that the beveled edge being formed on the knife is the proper one. The stone and bracket 7 form a pocket into which the knife edge 9 being sharpened is inserted and can be readily guided along and moved axially in the pocket. With the 2" diameter grinding wheel and a speed of about 9,000 r.p.m., a peripheral speed of 5 to 6 thousand feet per minute is provided and has been found to be very effective.

With the present operation, not only is the knife sharpened at the proper angle and uniformity along its length, but such can be accomplished without removing the knife from the restricted area in which it is normally located. Furthermore, the grinding stone itself will wear evenly with the present invention.

Various modes of carrying out the invention are contemplated as being within the scope of the following claims particularly pointing out and distinctly claiming the subject matter which is regarded as the invention:

1. A portable knife grinder comprising a self contained power unit having a support frame, a drive shaft extending from the frame, a small diameter grinding wheel fixed to the outer end of the drive shaft for rotation therewith, a tubular member surrounding the drive shaft and fixed at one end to the frame of the power unit, a knife guiding bracket welded to said tubular member adjacent the outer end thereof and having a portion extending generally radially from the tubular member, said radially extending portion being straight and flat and adapted to lay against one side of a knife being sharpened, said wheel and radially extending portion defining a pocket into which the knife edge being sharpened is inserted and can be moved axially therein, and a handle on one side of the portable grinder and located generally at the juncture of said tubular member and said power unit.

2. A grinder as defined in claim 1 wherein said wheel is of about a two inch diameter and rotates at about 9,000 r.p.m.

3. A grinder as set forth in claim 1 further characterized in that said drive shaft extends outwardly past said handle about two feet.

4. A portable knife grinder comprising a self contained power unit having a support frame, a drive shaft extending from the frame for a length of about two feet, a grinding wheel of a diameter of about two inches and fixed to the outer end of the drive shaft for rotation therewith at a speed of in the neighborhood of 9,000 r.p.m., a tubular member surrounding the drive shaft and fixed at one end to the frame of the power unit, a knife guiding bracket welded to said tubular member adjacent the outer end thereof and having a portion extending generally radially from the tubular member, said radially extending portion being straight and flat and adapted to lay against one side of a knife being sharpened, said wheel and radially extending portion defining a pocket into which the knife edge being sharpened is inserted and can be moved axially therein, and a handle on one side of the portable grinder and located generally at the juncture of said tubular member and said power unit.

References Cited

UNITED STATES PATENTS

| | | | |
|---|---|---|---|
| 772,305 | 10/1904 | Williams | 51—173 |
| 1,961,328 | 6/1934 | Beach | 51—173 X |
| 2,993,312 | 7/1961 | Holland et al. | 51—173 X |

LESTER M. SWINGLE, *Primary Examiner.*